United States Patent
Job

(10) Patent No.: US 6,464,201 B2
(45) Date of Patent: Oct. 15, 2002

(54) VALVE FOR A MOTOR VEHICLE AIR SPRING HAVING AN ANCILLARY VOLUME

(75) Inventor: Heinz Job, Neustadt (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/863,269

(22) Filed: May 24, 2001

(65) Prior Publication Data

US 2001/0054703 A1 Dec. 27, 2001

(30) Foreign Application Priority Data

May 24, 2000 (DE) .......................... 100 25 749

(51) Int. Cl.$^7$ .............................................. F16K 51/00
(52) U.S. Cl. ..................... 251/118; 239/569; 239/601; 251/359; 251/333
(58) Field of Search ................... 251/333, 118, 251/129.15, 359; 239/601, 569, 533.12, 533.13

(56) References Cited

U.S. PATENT DOCUMENTS

| | | | | |
|---|---|---|---|---|
| 2,649,273 A | * | 8/1953 | Honegger | .................. 251/333 |
| 3,729,025 A | | 4/1973 | Silvestrini | |
| 4,659,062 A | * | 4/1987 | Mooney | .................... 251/118 |
| 5,271,601 A | * | 12/1993 | Bonzer et al. | .............. 251/118 |
| 5,765,814 A | * | 6/1998 | Dvorak et al. | .............. 251/118 |
| 6,189,519 B1 | * | 2/2001 | Press et al. | ............ 251/129.15 |

* cited by examiner

Primary Examiner—Lesley D. Morris
Assistant Examiner—John Bastianelli
(74) Attorney, Agent, or Firm—Walter Ottesen

(57) ABSTRACT

A valve (12) for a motor vehicle air spring (2) having an ancillary volume (6) provides a finely metered continuous opening up to the complete cross section without throttle and a stable performance for flow forces results. The valve (12) is characterized by a star nozzle (50) which includes any desired number of slots $n_S$ (52) which mutually intersect and each slot has the length $D_S$ (58) and a width $s_S$ (56) and the slots are arranged so as to be concentric. The star nozzle peripheral length $L_{US}$ (64) is increased compared to a round nozzle $L_{UR}$. For the valve cross section, $A_{VS}=L_{US} \cdot H_S$ applies. The throughput cross section $A_{DS}$ of the star nozzle (50) is so large that it corresponds at least to the cross section $A_L$ of the inlet (68) and the outlet (70). A preferably triangular-shaped valley-like recess (66) is provided between each two mutually adjacent ones of the slots (52). The sealing body (40) of the valve (12) is preferably configured as a collar. The valve (12) can be provided with a second collar (74). The star nozzle valve (12) is applicable in all areas where a large cross section must be completely cleared at low switching times and forces.

8 Claims, 4 Drawing Sheets

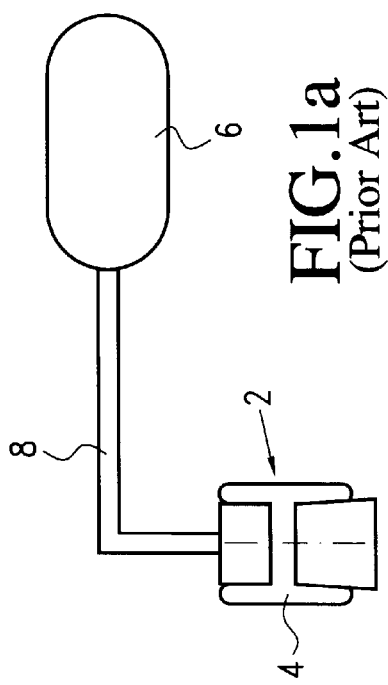
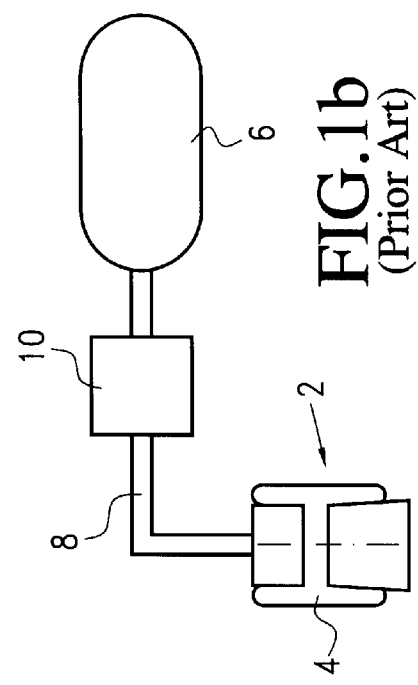
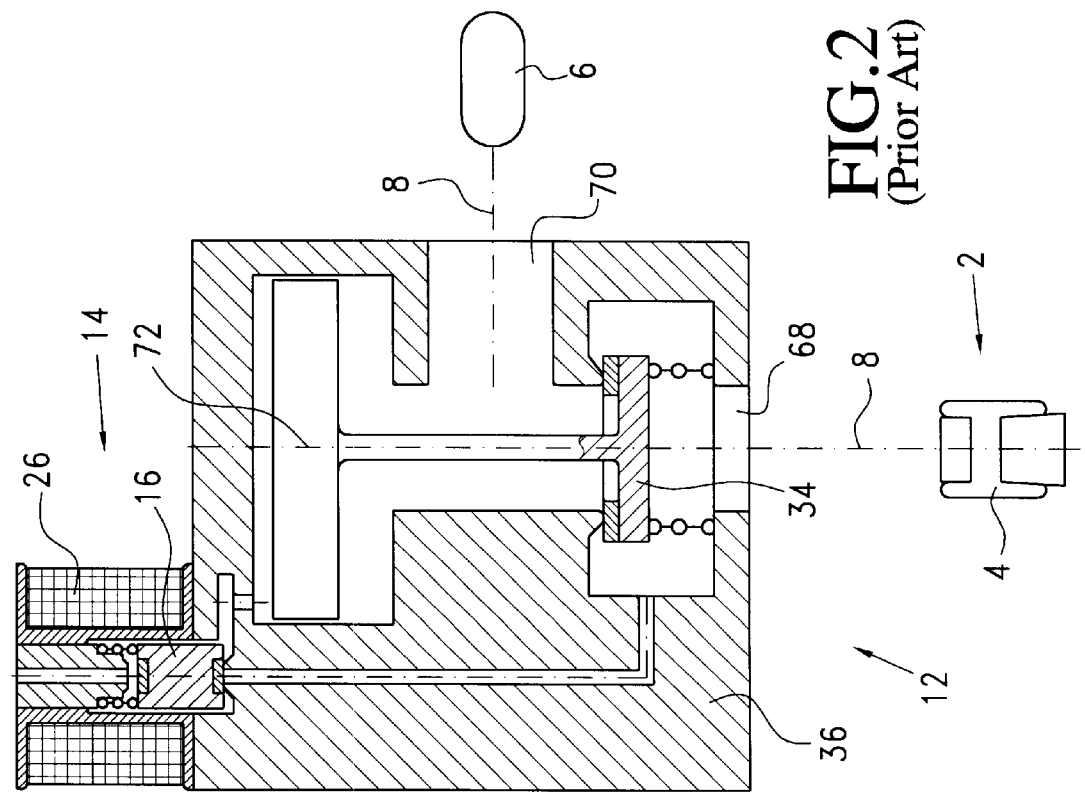

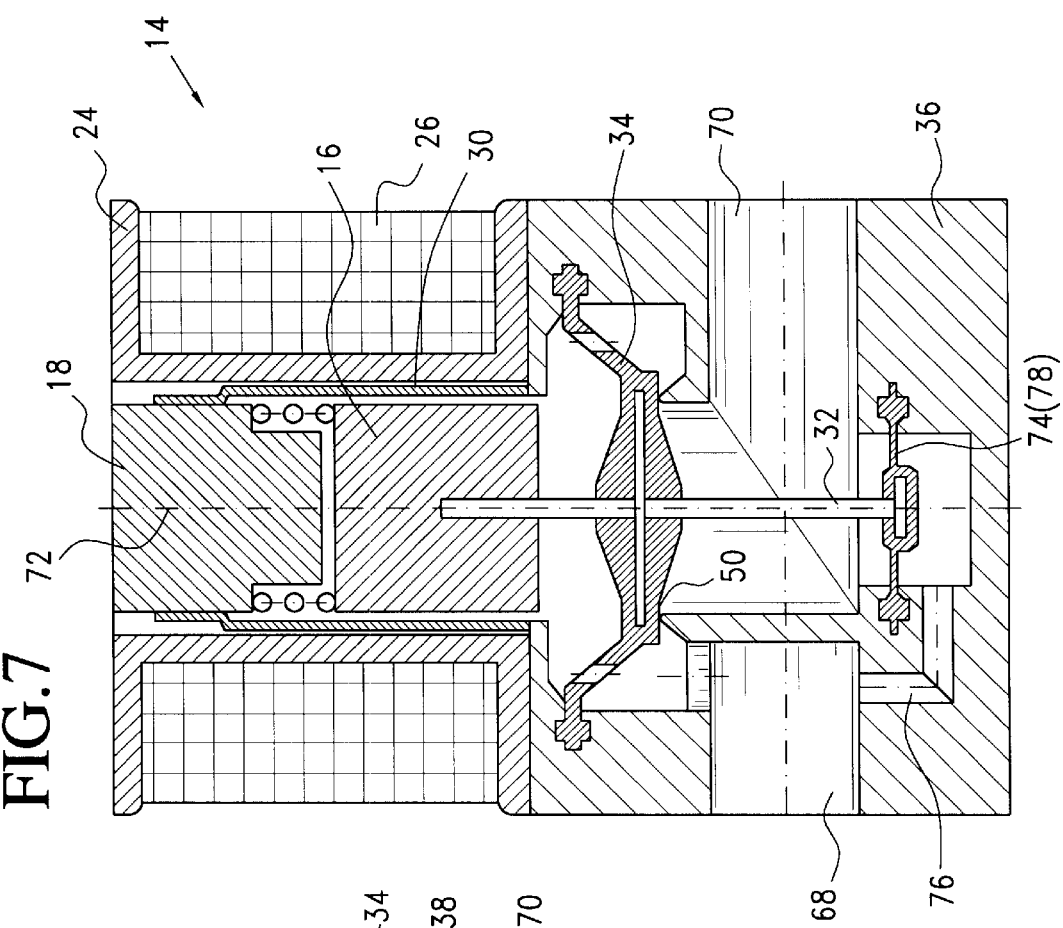
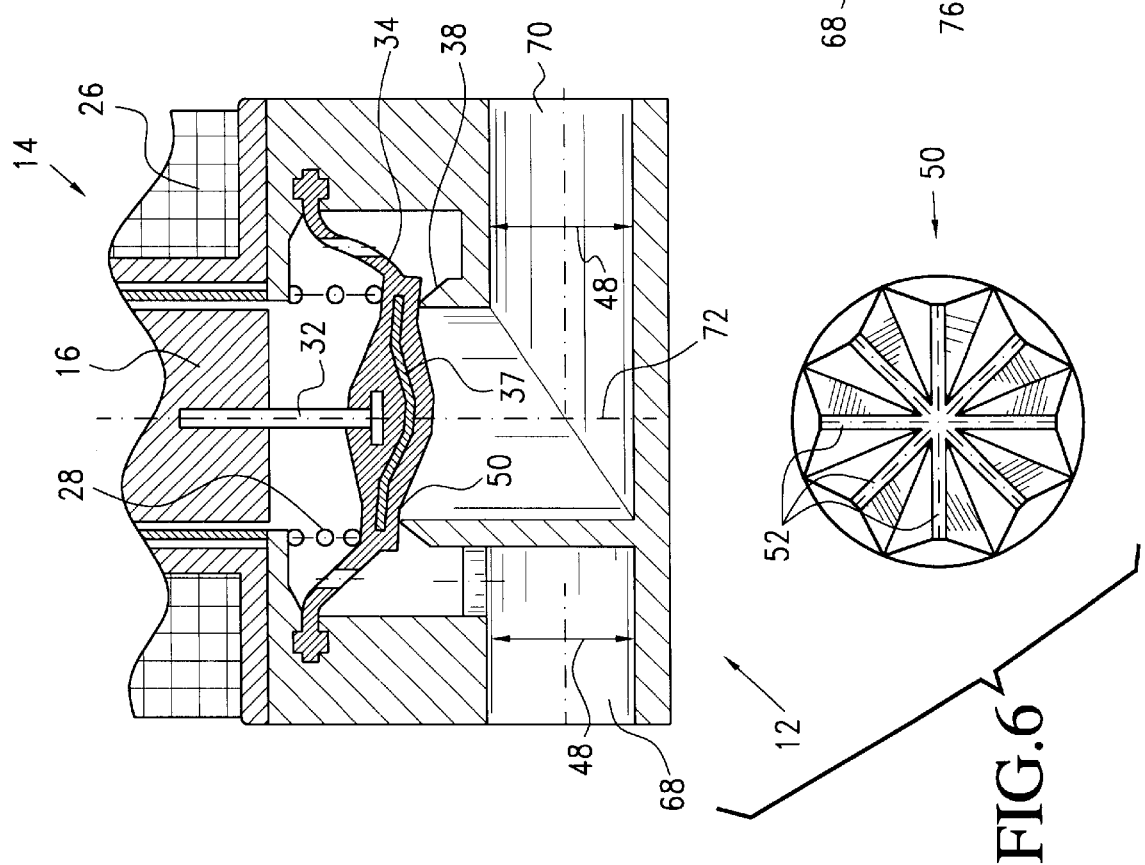

VALVE FOR A MOTOR VEHICLE AIR SPRING HAVING AN ANCILLARY VOLUME

BACKGROUND OF THE INVENTION

When utilizing air springs in passenger cars, a largest possible air volume is to be used to obtain optimal suspension comfort. Mostly, there is insufficient space at the wheel because of chassis components such as a longitudinal control arm, brake and drive shaft. For this reason, this large air volume is subdivided into an air spring volume and an ancillary volume (see FIG. 1a). The ancillary volume can then be accommodated at a location in the vicinity such as in the engine compartment, in the longitudinal support, in the trunk, et cetera. Both volumes are then connected by a line having a cross section which is of such a dimension that an air exchange can take place very rapidly and without significant pressure loss. If the vehicle travels on cobblestones, for example, then the air spring contracts and expands in correspondence to the road speed at a high frequency. Each spring contraction operation and each spring expansion operation is associated with an air exchange which may not be hindered because the suspension comfort would otherwise be reduced.

A high suspension comfort means a reduced spring stiffness. In accordance with the above, this is achieved with a large air spring volume. It is, however, a disadvantage that the steering becomes loose. Likewise, for a low spring stiffness, the driving performance changes when braking, when accelerating, and in travel through a curve as well as with rapid avoidance maneuvers. This change in driving performance is in the direction of instability which is unwanted because driving safety is thereby affected.

In order to resolve this conflict between comfortable air spring design and stability of the driving performance, the above-described line is provided with a valve, which can be blocked (see FIG. 1b). During normal driving conditions, the valve is open and is open in such a manner that the valve presents no significant hindrance for the air exchange between the air spring and the ancillary volume. If the vehicle is now braked, accelerated or driven in a curve or is compelled to execute a rapid defensive maneuver, then the valve is abruptly closed by a control apparatus which can detect the driving state by means of sensors. Thus, the air spring and the ancillary volumes are separated from each other with the consequence that only the air spring volume is available for the suspension operation. The spring stiffness is therefore higher and the vehicle has a more stable driving performance.

The valve is again opened as soon as the control apparatus detects that none of the above-described driving conditions is present any longer. This opening operation has to be carried out in such a manner that a pressure difference between the air spring volume and the ancillary volume, which has possibly formed in the meantime, can be slowly compensated so that there is therefore no sudden drop or upward bucking of the vehicle. only when the pressure compensation is complete can the valve again be completely opened.

Valves for this purpose are known. They are mostly realized as precontrol valves in truck design wherein a small electromagnetic valve switches a large pneumatically actuated valve (see FIG. 2). The alternative is an electromagnetic actuation of the valve. In the design of passenger cars, there is, however, no corresponding compressed air source of sufficient power present in order to switch the pneumatically actuated valve. For this reason, only the electromagnetic actuation remains (see FIG. 3a).

Independently of the nature of the actuation (magnetic valve or pneumatically actuated valve), a large valve stroke is needed as a consequence of the large line cross section in order to clear or enable the cross section completely (FIG. 3b). If the cross-sectional area of the line is defined as $A_L = D_L^2 \cdot \pi/4$, then the open cross section is characterized by $A_{VR} = L_{UR} \cdot H_R = D_R \cdot \pi \cdot H_R$ for a circular valve seat. This results from the peripheral length $L_{UR}$ and the stroke $H_R$. In order that there be no constriction, both cross-sectional areas $A_L$ and $A_{VR}$ have to be of the same size so that: $H_R = D_R/4$. In practice, this means a stroke $H_R$ of approximately 5 mm for $D_L = 20$ mm.

Two disadvantages are associated with the large stroke. First, the actuating force of an electromagnet drops disproportionately with distance becoming ever greater. Accordingly, for valve actuation, an electromagnet is required which has a larger number of turns having low resistance and therefore also having a large valve mass and introducing a high cost. Secondly, armature and sealing body of the valve are accelerated by its spring in the direction toward the valve seat when switching off the actuating current. As a consequence of the large stroke, high speeds and large decelerations become effective when landing on the valve seat; that is, the sealing body generates a noise when striking the valve seat, which can be similar to the blow of a hammer.

In truck air spring systems, valves exist for rapid closing and slow opening on the basis of a pneumatic actuation.

Magnetic valves are known in passenger car air springs and have been adapted to the larger line cross section. Additionally, a pressure relief has been provided in order to reduce the acting forces. However, all of these solutions are associated with friction and do not permit a trouble-free adjustment or control. In the manufacture of trucks, the valves are pneumatically actuated because the pneumatic has a higher energy density. The high energy consumption (compressed air escapes) is of no essential significance. Likewise, the switching noise is also of no great consequence.

SUMMARY OF THE INVENTION

It is an object of the invention to provide a valve for a motor vehicle air spring.

The valve of the invention is for a motor vehicle air spring system including an air spring volume and an ancillary volume. The valve is mounted between the air spring volume and the ancillary volume and the valve includes: an inlet having a cross section ($A_L$) and an outlet having a cross section ($A_L$); a star nozzle defining a valve seat and being disposed between the inlet and the outlet; a valve body movable between a first position wherein the valve body is in contact engagement with the valve seat to close a flow path between the air spring volume and the ancillary volume and a second position wherein the flow path is at least partially open; the star nozzle including a nozzle body having a plurality of mutually intersecting slots ($n_s$) formed concentrically therein; each of the slots having a length ($D_s$) and a width ($S_s$); the star nozzle having a peripheral length ($L_{US}$) increased with respect to the peripheral length ($L_{UR}$) of a round nozzle with the valve having a valve cross section ($A_{VS}$) given by $A_{VS} = L_{US} * H_S$ wherein $H_S$ is star nozzle stroke and the star nozzle stroke is given by $H_s = A_{VS}/L_{US}$ wherein the peripheral length ($L_{US}$) is given by $L_{US} = D_s * S_s * n_s$; the star nozzle having a pass-through cross section ($A_{DS}$) corresponding to the valve cross section ($A_{VS}$) and being so large that the pass-through cross section ($A_{DS}$)

corresponds at least to the cross section ($A_L$) Of the inlet and the outlet; and, the nozzle body having a valley-like recess formed between each two mutually adjacent ones of the slots.

The valve of the invention has the following characteristics, namely:
a) small mass;
b) low consumption of electrical energy;
c) full cross section without throttling;
d) very short reaction time;
e) stable performance in the presence of flow forces;
f) tight blocking of the line;
g) finely metered continuous opening;
h) no disturbing noise; and,
i) cost effective.

According to the invention, a star nozzle is used in lieu of a circular valve seat. This star nozzle (FIG. 5) is characterized in that a desired number of slots $n_S$ having the length $D_S$ and the width $s_S$ are concentrically arranged and mutually intersect. As a special case, a nozzle with $n_S=1$ is considered wherein the slot is long and narrow. The star nozzle peripheral length $L_{US}$ is increased relative to that of the round nozzle $L_{UR}$ and thereby the following applies for the valve cross section $A_{VS}=L_{US} \cdot H_S$. The required stroke $H_S$ is significantly less than the stroke $H_R$ of the circular nozzle for a corresponding configuration ($n_S$, $D_S$, $s_S$, $R_s$). The throughput cross section $A_{DS}$ of the star nozzle must be so large that it corresponds at least to the cross section $A_L$ of the line. On the outside of the nozzle, there is a valley-like recess between each two mutually adjacent ones of the slots with this valley-like recess having a triangular cross-sectional surface. These function to make possible the access of the inflowing air to the inner part of the star. As a consequence of the star nozzle, the valve stroke can be significantly less. For this reason, fewer turns of an electromagnet (for the same current) are sufficient. The valve is more cost effective, smaller and lighter because of the fewer turns. Or, as a consequence of the smaller stroke, the current can be reduced so that less energy is consumed. The sealing body and armature are braked to a lesser extent with the impact against the valve seat because of the smaller stroke whereby less noise is produced. The electromagnet can be operated along the steepest portion of its characteristic line as a consequence of the small stroke. The valve is therefore insensitive to flow forces and has a stable characteristic line.

The sealing body is secured against rotation by the form of the collar (FIG. 4). Every indentation in the seal body always comes to the same location of the star nozzle as a consequence of the hold against rotation. Accordingly, permanent deformations (rubber pressure residual deforming) have no negative effects. Because the collar is made of rubber, the movement is dampened via the material damping and this reduces noise.

The star nozzle can be positioned at an angle (FIG. 6). In this way, a gearing in effect develops and the opening operation can be metered with a greater precision. The star nozzle can be provided with a second membrane (FIG. 7) or, preferably, with two rolling membranes as disclosed in parallel patent application Ser. No. 09/863,269, filed on May 24, 2001, and corresponding to German patent application 100 25 753.4, filed May 24, 2000, and incorporated herein by reference. The pressure is likewise applied to this second membrane and this leads to a relief of pressure. Because of the pressure differences reduced thereby, the forces are smaller and this leads to an additional reduction of the size needed. Compared to conventional pressure reliefs, this type of pressure relief affords the advantage that no tolerance problems and no frictional forces occur.

The star nozzle can basically be connected to any drive. Advantageous drives are: a step motor as a linear motor, a piezo stack actuator (also with path conversion), piezo bending element actuator (torque block), electrochemical actuator, pneumatic actuator (precontrol valve). A very precise positioning and energy cutoff after reaching the desired position is possible with a step motor. With a piezo actuator, there is a very low consumption of energy and a very high accuracy as to position as well as a very short reaction time. with an electrochemical actuator, the following are obtained: very low consumption of energy, very high holding forces, high position accuracy even after switchoff of the energy supply and a defined fail-safe condition. With a pneumatic actuator, very short actuating times and very small control valves are obtained.

Overall, the star nozzle valve of the invention has the following advantageous characteristics, namely: small structural space required; low mass; short switching times; low noise development; low manufacturing costs; low power consumption; and, good operating stability.

The star nozzle valve according to the invention is suitable in all areas where a large cross section must be cleared with small switching times and forces.

BRIEF DESCRIPTION OF THE DRAWINGS

The invention will now be described with reference to the drawings wherein:

FIGS. 1a and 1b are schematics of an air spring each with an ancillary volume;

FIG. 2 is a longitudinal section view through a conventional truck air spring valve (a so-called precontrol valve);

FIG. 5b is a longitudinal section view of the star nozzle of FIG. 5a; and,

FIG. 5c is a plan view of the star nozzle of FIG. 5a;

FIG. 6 is a valve according to another embodiment of the invention wherein the star nozzle is shown inclined at an angle; and, FIG. 7 is a schematic of a valve, in longitudinal section, of a valve having a second membrane.

DESCRIPTION OF THE PREFERRED
EMBODIMENTS OF THE INVENTION

For tight space conditions, a comfortable motor vehicle air spring 2 preferably has an ancillary volume 6 in addition to the air spring volume 4 (FIG. 1a). Here, the air spring volume 4 of the air spring 2 and the air volume 6 of an ancillary vessel are connected via a line 8 having a large cross section.

In order to be able to adjust a comfortable air spring 2 harder than normal in critical driving situations, the connecting line 8 can be blocked (FIG. 1b) by means of a valve (valve unit 10) between the air spring volume 4 and the ancillary volume 6. This has the consequence that the spring action is then realized exclusively by the air spring volume 4.

Figure 3B:
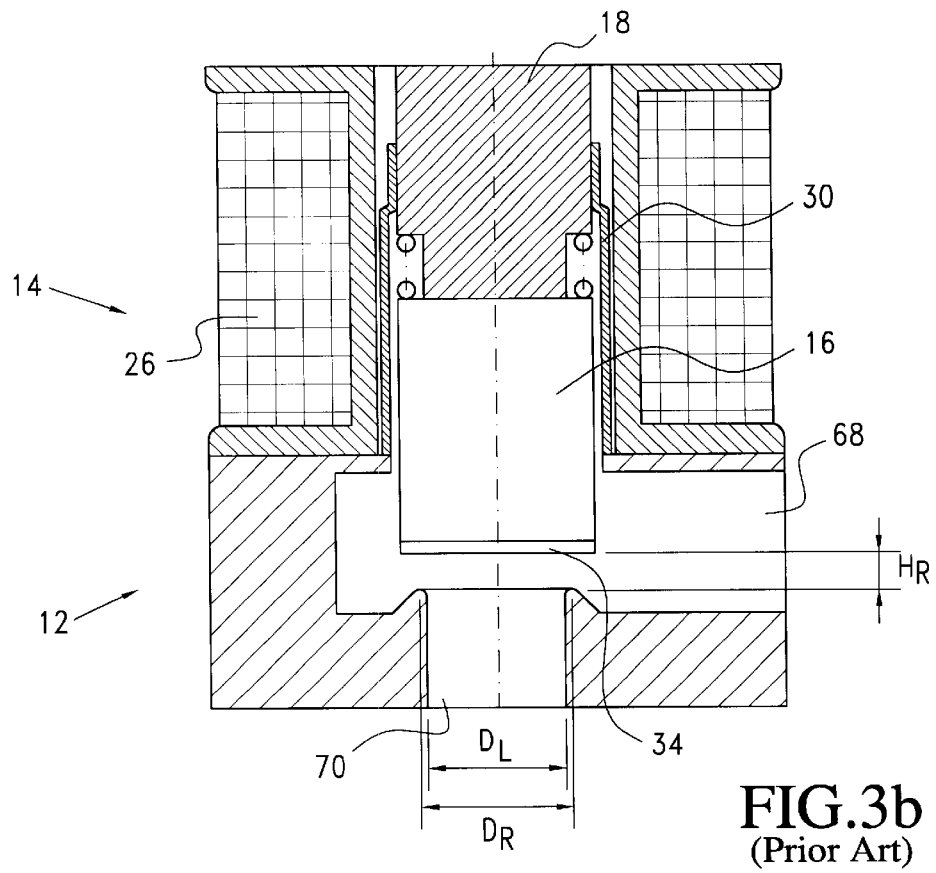
FIGS. 3a and 3b show a conventional electromagnetic actuable air spring valve in longitudinal section.
Figure 3A:
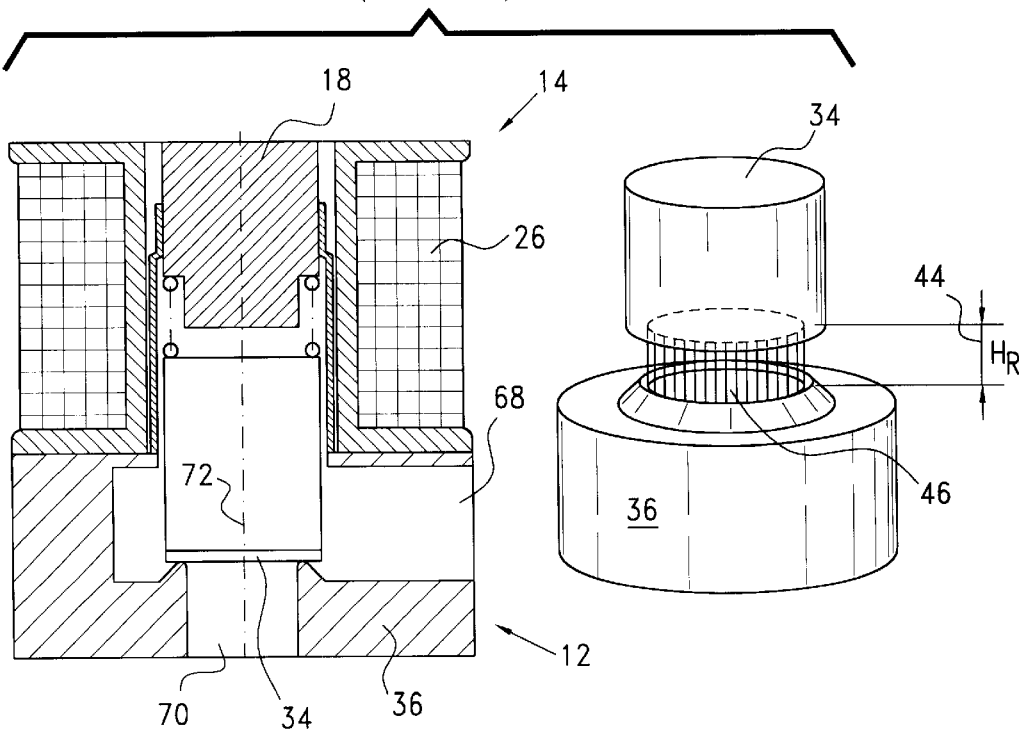

The valves shown in FIGS. 2, 3a and 3b are conventional and are for air springs 2 having ancillary volumes 6 and have the disadvantages described initially herein.

The valve unit (FIG. 2, FIG. 3a or FIG. 3b and FIG. 4) comprises the valve 12 and an actuating device 14. The actuating device 14 can, for example, be an electromagnet as shown in FIGS. 2, 3a, 3b and 4. The electromagnet includes the following parts: armature 16, pole piece 18, coil carrier 24, coil 26, spring 28, guide tube 30 and connecting rod 32. The connecting rod is connected to the valve body 34. These parts are independent of the actuating principle used and are therefore exchangeable.

The valve 12 comprises a valve housing 36, valve body 34, valve seat 38 and seal 40. Apertures 35 facilitate passage of air when the valve body 34 moves through the valve stroke. An insert 37 is provided to impart strength to the valve element 34 made of rubber.

In the basic state, the valve 12 is closed. Here, the spring 28 presses the armature 16 downwardly and the armature 16 moves the valve body 34 downwardly via the connecting rod 32 until the valve body is seated on the valve seat 38. The valve seat 38 is so positioned that the stroke 44 is not greater than necessary. The cross section 46, which is cleared by the valve 12, should be as large as the line cross section 48. The cleared cross section 46 results from: (stroke*$D_S$*$S_S$*$n_S$). The stroke 44 should not be greater than computed above because, otherwise, for a rapid closing, a longer stroke must be passed through which takes longer and therefore increases the closure time.

Figure 5A:
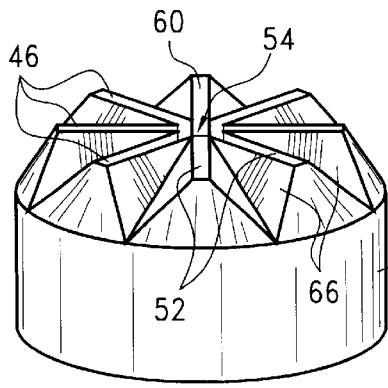
FIG. 5a is a perspective view of the star nozzle of the invention.
Figure 5B:
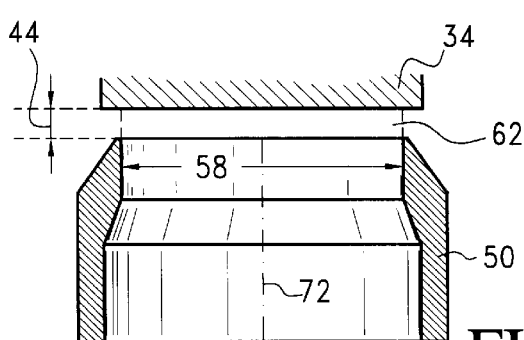
Figure 5C:
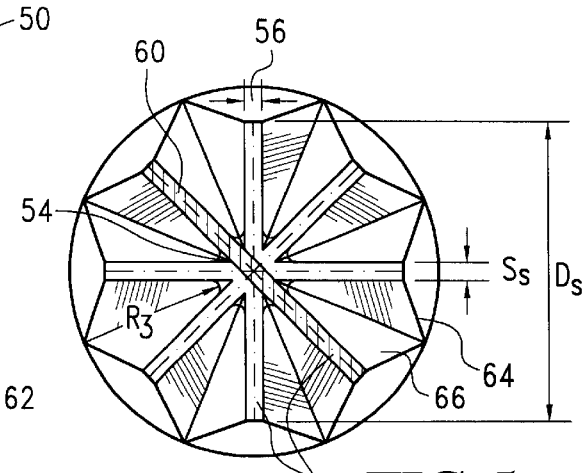

The essence of the invention is a star nozzle 50 (FIGS. 5a to 5c). Theoretically, the star nozzle can comprise any number of slots 52 which have a common center point 54 and a uniform angle distribution. In practice, it is practical to have two to six slots.

Each slot 52 has a specific width 56. This width 56 multiplied by the length 58 forms a slot having the slot area 60 (FIG. 5a). The sum of all slot areas 60 is the valve cross section 46 which must correspond at least to the line cross section 48 because, otherwise, a constriction of the air flow takes place. This is the first condition.

The second condition is that the air can also enter into the slots 52. For this purpose, the valve body 34 must be lifted. The peripheral area 62 must then be equal to the line cross section 48. If this is not the case, then the air flow is constricted.

Reference numeral 64 indicates the periphery of the star nozzle. If one lifts the valve body 34 from the valve seat by the stroke Hs, 44 (FIG. 5b), there results a peripheral area 62 which extends circumferentially. This is the passthrough surface for the air. The more slots 52 the greater is the peripheral area 62 which is available and the shorter the stroke 44 which is needed in order to maintain a large peripheral area 62. The peripheral area 62 is obtained from the peripheral length 64 and the stroke 44. Since the star nozzle 50 is slightly conical and the valve body 34 is made of rubber, the effective peripheral length 64 cannot be determined exactly.

Compared to a cylindrical nozzle, the star nozzle 50 has a greater periphery for the same dimensions and therefore, the stroke can be shortened without reducing the peripheral area 62 below the cross section 48 of the inlet and outlet lines (68, 70). In this way, the possibility is provided to clear a large cross-sectional area with a short electromagnetic stroke.

It is evident that the air must reach the slot 52 and also the interior of the star nozzle 50 where the slots 52 intersect. Otherwise, the peripheral area 62 could not be used. In order to make the interior of the star nozzle 50 accessible for the air, triangular-shaped valley recesses 66 are provided between the slots. The air flows through these valley-like recesses 66 and passes through the peripheral area 62 and then into the slot 52 where the air passes through the slot area 60.

A star nozzle 50 without valley-like recesses 66 could therefore not function without problems because the air could not use the larger peripheral area 62.

Figure 4:
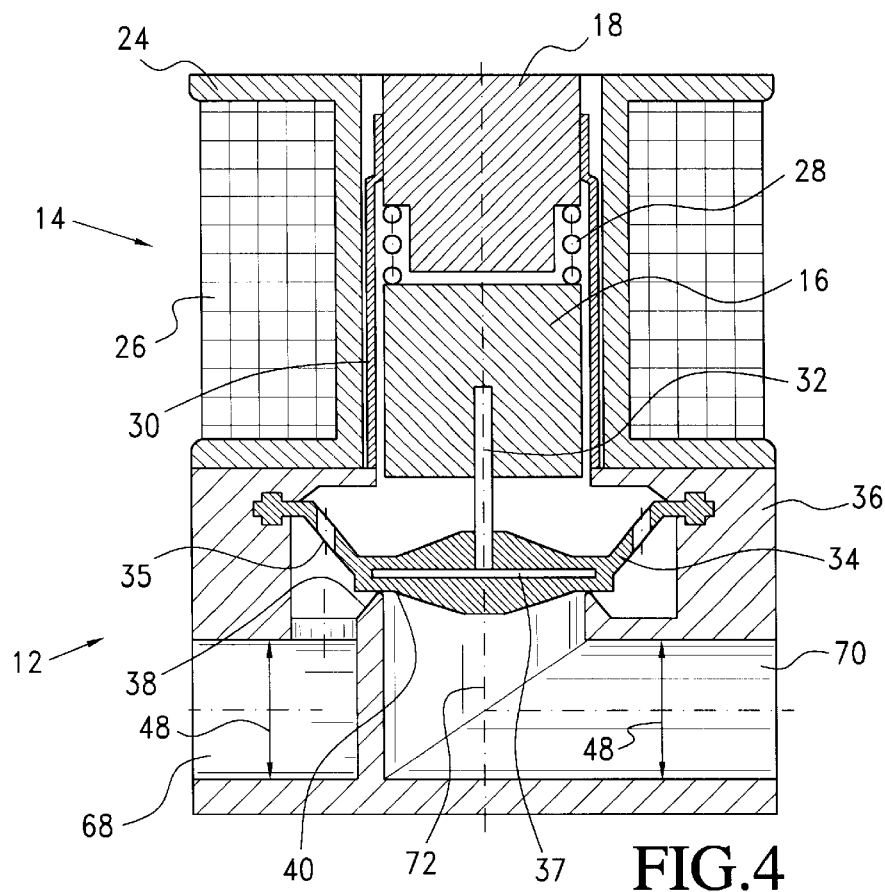
FIG. 4 is a schematic, in longitudinal section, of the valve provided with the star nozzle in accordance with the invention.

In FIG. 4, a valve 12 is shown having an electromagnetic actuation 14. If current flows through the coil 26, then a force develops which pulls the armature 16 toward the pole piece 18. As a consequence of the connecting rod 32, the valve body 34 is thereby moved upwardly. The valve body 34 therefore lifts up by the stroke $H_S$ 44 from the valve seat 38. The air can now flow as described with respect to FIGS. 5a to 5c. The valve seat 38 shown in the section view of FIG. 4 corresponds to the star nozzle 50 shown in FIGS. 5a to 5c. The star nozzle 50 is a circular structure as shown in FIGS. 5a to 5c but cannot be better seen in the section views of FIGS. 4, 6 and 7.

The magnetic field collapses after switching off the coil current. The spring 28 presses the armature 16 downwardly and thereby also the valve body 34 so that this valve body 34 is pressed onto the valve seat 38 (or the star nozzle 50). The connection between the inlet 68 and the outlet 70 is interrupted.

It is possible to configure the valve body 34 not as a membrane (as shown in FIG. 4) but as shown in FIG. 3a. In this case, the valve body 34 can rotate about its longitudinal axis 72. If one assumes that the rubber of the valve body 34 has sat a longer time on the star nozzle 50 (pressed on by the spring 28), then small recesses can remain in the valve body where the valve body 34 has contacted the star nozzle 50. When the valve body 34 now rotates, then the valve 12 can no longer seal without problems in the rest position. This can be alleviated with the membrane 74. The use of a membrane 74 is the most elegant solution, but is not the only solution which can be used. For example, a slot can be formed in the armature 16 and a lug can be introduced into the guide tube 30 so that the armature 16, and therefore the seal, can no longer rotate.

The seal is a part of the valve body 34. If the valve body 34 is a one-piece rubber part, then the seal is an integrated portion of the valve body.

With respect to FIG. 6, the same applies as in FIG. 4. However, in FIG. 6, the star nozzle 50 is now positioned so as to be inclined. If one lifts the seal a small amount, then the seal can be lifted on the one side off the valve seat 38 and remains seated on the opposite side. Accordingly, only a half opening cross section results. This can be continued until the valve body 34 has also lifted off the opposite side of the valve seat 38. This stroke region is therefore especially finely adjustable because, for a unit of one stroke, only half the cross section is cleared. This is of special significance when a slow pressure compensation is wanted between the air spring 2 and the ancillary volume 6. One has therefore inserted a gearing for a specific stroke region.

FIG. 7 corresponds to FIG. 4 but also shows pressure relief. Here too, the valve includes the star nozzle 50.

It is assumed that valve 12 of FIG. 4 is closed (without pressure compensation). Furthermore, it is assumed that after closing the valve 12, the air spring becomes contracted, assuming the vehicle has driven over a bump. Now, the air spring 2 has a higher pressure than before because of the volume reduced by the contracting operation. This pressure is greater than the pressure in the ancillary volume 6.

As a consequence of the pressure difference between the air spring 2 (30 bar) and the ancillary volume 6 (10 bar), the spring force must be so great that the valve body 34 nonetheless is pressed adequately tightly against the valve seat defined by the star nozzle 50 and is therefore closed. The spring force must therefore be greater than the pressure force difference. In this case, there are high forces relative to the structural size.

It can be assumed that the pressure difference vanishes because the air spring 2 has again assumed its normal position (the pressure in the air spring is then again 10 bar) and that the valve 12 is now to be opened. For this purpose, the magnetic force must be greater than the spring force. In order to overcome the relatively larger spring force, a still higher magnetic force must be developed. For the forces occurring here and the limited structural space, this lies outside of the physical limits, that is, no appropriate magnet can be realized.

The solution to this problem is that a pressure relief is provided as shown in FIG. 7. A pressure impact from the air spring 2 operates on the valve body 34 as well as on the pressure compensating membrane 74. This takes place by means of forces $F_{LD}$ and $F_{LM}$. When the seal seat area $\Delta_S$ and the membrane effective area $\Delta_W$ are the same, then the two forces $F_{LD}$ and $F_{LM}$ are of the same magnitude and compensate each other because of the connection provided by the connecting rod 52.

If the pressure of the ancillary volume 6 is directed via a pressure compensating bore 76 onto the armature 16 and onto the pressure compensating membrane 74 and, in addition, the membrane effective area $\Delta_W$ is selected equal to $\Delta_S$ (via constructive measures), then the two forces $F_{ZVA}$ and $F_{ZVM}$ are equal and therefore cancel each other. Because now all pressure forces are mutually compensated, only the spring force still operates on the armature 16. The spring force can be small because it must not operate against the pressure forces. The electromagnet 14 can now be so designed that it only has to overcome the small spring force and therefore the electromagnet 14 must generate no large forces. The electromagnet can therefore be designed to be small, light and cost effective.

The solution via a plate membrane 78 shown in FIG. 7 presents the problem, however, that the effective area $\Delta_W$ changes with the service life. The reason for this is the stretching of the membrane 78 by the pressure load. Likewise, $\Delta_W$ changes with the valve position and the influence of manufacturing tolerances is great. A complete pressure compensation is therefore not possible with a plate membrane 78.

If one replaces the plate membrane 78 with two roll membranes (as shown in patent application Ser. No. 09/863,269 filed on May 24, 2001, and claiming priority from German patent application 100 25 753.4, filed May 24, 2000), then the effective diameter $D_W$ is constant. This diameter is not so sensitive with respect to manufacturing tolerances. The only disadvantage is that higher costs are introduced with two roll membranes rather than one plate membrane 78.

It is understood that the foregoing description is that of the preferred embodiments of the invention and that various changes and modifications may be made thereto without departing from the spirit and scope of the invention as defined in the appended claims.

What is claimed is:

1. A valve for a motor vehicle air spring system including an air spring volume and an ancillary volume, the valve being mounted between said air spring volume and said ancillary volume and said valve comprising:

an inlet having a cross section ($A_L$) and an outlet having a cross section ($A_L$);

a star nozzle defining a valve seat and being disposed between said inlet and said outlet;

a valve body movable between a first position wherein said valve body is in contact engagement with said valve seat to close a flow path between said air spring volume and said ancillary volume and a second position wherein said flow path is at least partially open;

said star nozzle including a nozzle body having a plurality of mutually intersecting slots ($n_s$) formed concentrically therein;

each of said slots having a length ($D_s$) and a width ($S_s$);

said star nozzle having a peripheral length ($L_{US}$) increased with respect to the peripheral length ($L_{UR}$) of a round nozzle with said valve having a valve cross section ($A_{VS}$) given by $$A_{VS}=L_{US}*H_s$$

wherein $H_s$ is star nozzle stroke and said star nozzle stroke is given by $$H_s=A_{VS}/L_{US}$$

wherein said peripheral length ($L_{US}$) is given by $$L_{US}=D_s*S_s*n_s$$

said star nozzle having a pass-through cross section ($A_{DS}$) corresponding to said valve cross section ($A_{VS}$) and being so large that said pass-through cross section ($A_{DS}$) corresponds at least to said cross section ($A_L$) of said inlet and said outlet; and, said nozzle body having a valley-like recess formed between each two mutually adjacent ones of said slots.

2. The valve of claim 1, wherein said valley-like recess has a triangular-shaped cross section or a trapezoidal-shaped cross section.

3. The valve of claim 2, further comprising a collar seal of elastic material formed as part of said valve body.

4. The valve of claim 3, wherein said valve body and said collar seal conjointly define an integral member made of rubber or polyurethane.

5. The valve of claim 1, wherein said valve defines a longitudinal axis; and, said star nozzle is orientated at an angle to said longitudinal axis.

6. The valve of claim 3, wherein said collar seal is a first collar seal; and, said valve further comprises:

a second collar seal;

a connecting rod operatively connecting said second collar seal to said first collar seal;

said second collar seal having a first side facing toward said outlet and a second side facing away from said outlet; and, a compensating line connecting said second side to said inlet.

7. The valve of claim 1, wherein said valve further comprises an electromagnetic drive for actuating said valve body to move from one of said positions to the other one of said positions.

8. The valve of claim 1, wherein said valve further comprises a drive for driving said valve body; and, said drive is selected from the group consisting of: a step motor defining a linear actuator, a piezo stack actuator with path translation, a piezo bending element actuator (torque block), an electromagnetic actuator and a pneumatic actuator.

* * * * *

UNITED STATES PATENT AND TRADEMARK OFFICE
CERTIFICATE OF CORRECTION

PATENT NO. : 6,464,201 B2
DATED : October 15, 2002
INVENTOR(S) : Heinz Job

It is certified that error appears in the above-identified patent and that said Letters Patent is hereby corrected as shown below:

Column 1,
Line 56, delete "only" and substitute -- Only -- therefor.

Column 2,
Line 6, delete "$A_L = D_L^2 \cdot n/4$" and substitute -- $A_L = D_L^2 \cdot II/4$ -- therefor.
Line 7, delete "$A_{VR}=L_{UR} \cdot H_R = D_R \cdot H \cdot H_R$" and substitute -- $A_{VR}=L_{UR} \cdot H_R = D_R \cdot II \cdot H_R$ -- therefor.

Column 3,
Line 1, delete "Of" and substitute -- of -- therefor.
Line 58, delete "09/863,269" and substitute -- 09/863,267 -- therefor.

Column 4,
Line 10, delete "with" and substitute -- With -- therefor.

Column 5,
Line 46, delete "Hs," and sustitute -- $H_s$, -- therefor.

Column 6,
Line 15, delete "Sc" and substitute -- 5c -- therefor.

Column 7,
Line 49, delete "269" and substitute -- 267 -- therefor.

Signed and Sealed this

Second Day of September, 2003

JAMES E. ROGAN
*Director of the United States Patent and Trademark Office*